United States Patent [19]

Jakel

[11] 4,014,444
[45] Mar. 29, 1977

[54] SNOWMOBILE TRAILER

[75] Inventor: Paul A. Jakel, Reeseville, Wis.

[73] Assignee: Jakel Company, Inc., Reeseville, Wis.

[22] Filed: Sept. 11, 1975

[21] Appl. No.: 612,612

[52] U.S. Cl. .............................................. 214/85
[51] Int. Cl.² ...................................... B65G 67/02
[58] Field of Search ..................... 214/85, 85.1, 506

[56] References Cited

UNITED STATES PATENTS 3,923,335  12/1975  Erickson ..................... 214/85 X

FOREIGN PATENTS OR APPLICATIONS 720,526  12/1931  France .............................. 214/85

Primary Examiner—Robert G. Sheridan
Attorney, Agent, or Firm—Wheeler, Morsell, House & Fuller

[57] ABSTRACT

A snowmobile trailer has a ramp which is connectable to the platform and frame assembly in two positions at the rearward end of the trailer for loading two snowmobiles in adjacent storage lanes and is connectable at an angle at two positions adjacent the forward end of the platform and frame assembly for unloading trailers under their own power forwardly of the trailer to both sides of the trailer tongue. A V-shaped deflector above and forwardly of the trailer bed deflects the snowmobile skis as the snowmobile moves forward to steer and guide the snowmobile onto the angularly related ramp for forward unloading. Upturned marginal flanges on the ramp also guide the skis to steer the snowmobile during unloading and loading.

4 Claims, 4 Drawing Figures

SNOWMOBILE TRAILER

SUMMARY OF INVENTION

The invention provides a snowmobile trailer which is adapted to load two snowmobiles from the rear and to unload the snowmobile forwardly of the trailer under their own power to eliminate the need for manually moving the snowmobiles off the rear of the trailer. Various of the snowmobiles on the market do not have a reverse gear and thus, are not easily unloaded at the rear of a trailer.

The trailer ramp has a width approximately equal to one half the width of the trailer bed. Means are provided for connecting the ramp in two forward positions at an acute angle with respect to the longitudinal centerline of the trailer to clear the trailer tongue for forward unloading. When unloading in the forward position, the tow vehicle, if connected during unloading, is located at an angle with respect to the trailer to provide clearance for the ramp.

A V-shaped deflector located at the forward end of the trailer bed engages and guides the skis of the snowmobile to divert the snowmobile onto the ramp.

Further objects, advantages and features of the invention will become apparent from the following disclosure.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
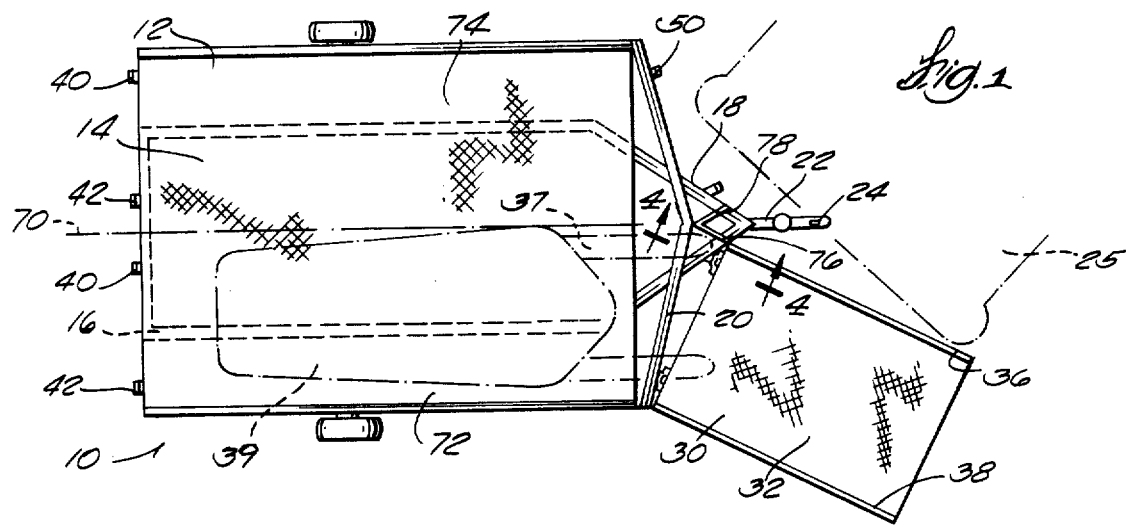
FIG. 1 is a plan view of a snowmobile trailer in accordance with the invention with the ramp connected for forward unloading and a fragmentary view of a tow vehicle.
Figure 2:
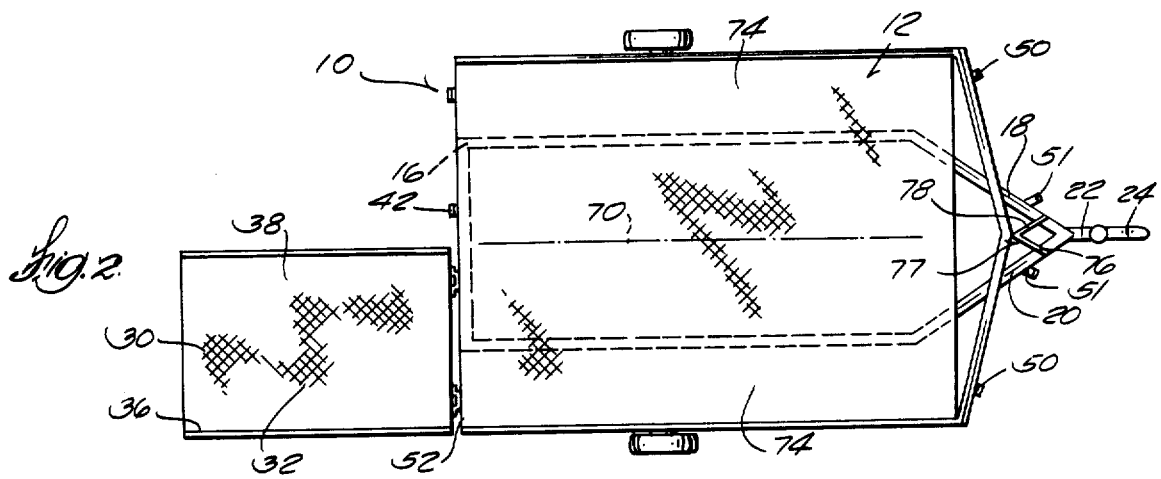
FIG. 2 is a view similar to FIG. 1 showing the ramp in one of two rearward loading positions.
Figure 3:
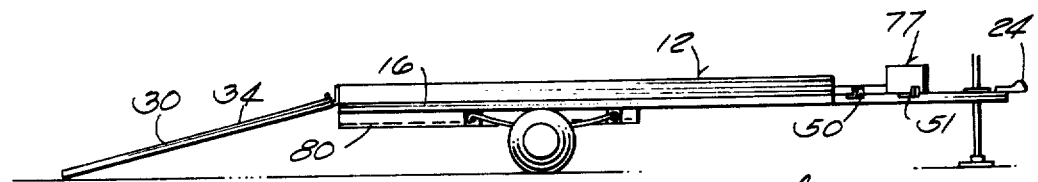
FIG. 3 is a side elevational view of the trailer shown in FIG. 2.
Figure 4:
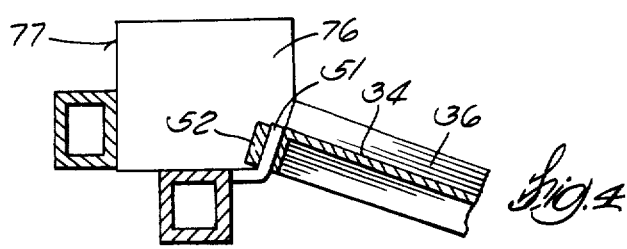
FIG. 4 is an enlarged sectional view along line 4—4 of FIG. 1.

In the drawings, FIG. 1 shows a snowmobile trailer 10 in accordance with the invention which includes a frame and platform assembly 12. The platform can be formed from wire mesh 14 supported on a steel frame 16 (FIG. 3). The frame includes two forwardly extending A-frame structures 18, 20. The A-frame structure 18 is connected to the draw bar 22 which is provided with a hitch 24 for connection to a tow vehicle 25. The A-frame section 20 is located above and supported on A-frame section 18. As shown in FIG. 1, the A-frame section 20 bridges the gap between the ramp 30 and the platform 14 when snowmobiles are unloaded forwardly of the trailer, with the ramp 30 in a forward unloading position.

The ramp 30 can also be provided with a wire mesh surface 32 supported on a metal frame 34. The ramp 30 is provided with upturned marginal flanges 36, 38 to engage and guide the snowmobile skis 37 of the snowmobile 39 when unloading or loading the trailer.

In accordance with the invention, means are provided for selectively connecting the ramp to the forward and rearward ends of the trailer for two rear loading positions and two forward unloading positions. In the disclosed construction, the means for connecting the ramp to the trailer comprises two sets of upturned brackets or hooks 40, 42 at the rearward end of the trailer and two sets of hooks or brackets 50, 51 at the forward end of the trailer. The ramp is provided with two spaced loops 52 which engage the hooks for support of the ramp in either of the two forward or rear positions.

As best shown in FIG. 3, the hooks 50 are connected to the under surface of the A-frame and the hooks 51 are connected to the top surface of the A-frame section 18 so that the hooks are of uniform height to support the ramp upper edge at a uniform height. Such an arrangement of loops 50, 51 thus aligns the ramp at an angle with respect to the centerline 70 of the trailer bed to provide clearance with the tow bar 22. As shown in FIG. 1, the snowmobile in lane 72 can be unloaded while the trailer is still connected to the towing vehicle which is angularly parked to provide clearance. With forward unloading from lane 74, the tow vehicle would be oriented to extend in the direction or the unloading ramp shown in FIG. 1, to provide clearance.

To assist in guiding the vehicle onto the forwardly and angularly oriented ramp 30, in either forward unloading position, the snowmobile trailer is provided with a V-shaped deflector 77. The deflector is oriented along the centerline 70 of the trailer so that each deflector plate sections 76, 78 will be parallel to the adjacent ramp guide flanges 36 or 38 and form a continuous extension therefore, to guide the snowmobile skis across the gap between the trailer bed and the ramp and onto the ramp 30.

The trailer is also provided with a jackpost 80 to support the trailer when not connected to a tow vehicle. Loading and unloading can be accomplished as described above when the trailer tongue is supported by the jackpost.

The ramp 30 can be stored on the framework 80 (FIG. 3) and beneath the platform 14 when the ramp 30 is not being used.

Although the trailer disclosed herein has been described as a carrier for two snowmobiles, it also can be constructed of sufficient length to carry four or six snowmobiles. The longer trailer would load and unload as herein above described.

I claim:

1. A snowmobile trailer comprising a platform and frame assembly said frame assembly including a tongue and hitch for connection to a tow vehicle, wheel means for supporting the frame and platform for travel along the ground, a loading and unloading ramp, and means for selectively connecting said ramp to the rear end of said platform and frame assembly for loading vehicles on said assembly and for connection to the forward end of said platform and frame assembly with the longitudinal centerline of said ramp at an angle extending away from the centerline of said platform and frame assembly to afford unloading of snowmobiles from the forward end of said assembly and with clearance with said tongue and including a deflector located above the platform of said trailer and forwardly of said platform, said deflector being oriented along a line parallel to the centerline of said ramp when said ramp is connected to the forward end of said platform and frame assembly to guide snowmobiles onto said ramp.

2. A trailer in accordance with claim 1 wherein said deflector is V-shaped with the apex of the V located on the longitudinal center line of said trailer and said platform has two storage lanes with the deflector oriented to divert snowmobiles from the lanes for right and left unloading from said platform.

3. A snowmobile trailer comprising a platform and frame assembly, wheel means for supporting the frame and platform for travel along the ground, a loading and unloading ramp, said ramp having upwardly extending guide flanges on the side margins of said ramp for engaging and guiding the skis of a snowmobile along a discharge path transverse to the storage position on the trailer, said frame including a forwardly extending frame member, a hitch connected to said forwardly extending frame member and means for selectively and detachably connecting said ramp to the rear end of said platform and frame assembly for loading vehicles on said assembly and for connection to said forwardly extending frame member and said frame assembly with the longitudinal centerline of said ramp at an angle extending away from the centerline of said platform and one of said guide flanges on said ramp extending to proximate the centerline of said platform to engage the skis and divert a snowmobile driven forwardly on said platform with said ramp extending forwardly of said hitch to afford unloading of snowmobiles from the forward end of said trailer and with clearance with a tow vehicle when the centerline of the tow vehicle is at an angle transverse to the longitudinal centerline of said trailer.

4. A trailer comprising a platform and frame assembly having a width to accommodate two vehicles, wheel means for supporting the frame and platform for travel along the ground, a loading and unloading ramp to enable loading and unloading of the vehicle under their own power, said ramp having a width less than the width of said platform, said frame including a forwardly extending frame member, a hitch connected to said forwardly extending frame member and means for selectively and detachably connecting said ramp in two loading positions at the rear of said platform to load vehicles in side by side relationship and in two forward unloading positions with the ramp diverging forwardly and outwardly from the platform in each of said forward positions at an angle transverse to the centerline of the trailer and on opposite sides of the centerline and with the ramp affording clearance with a tow vehicle when the centerline of the tow vehicle is at an angle transverse to the longitudinal centerline of said trailer and extending oppositely of the ramp.

* * * * *